Dec. 16, 1930.  A. L. DUNCAN  1,785,001
FRUIT TREATING METHOD AND APPARATUS
Filed Jan. 5, 1926    4 Sheets-Sheet 1

Inventor
Arthur L. Duncan
By William A. Strauch
Attorney

Patented Dec. 16, 1930

1,785,001

UNITED STATES PATENT OFFICE

ARTHUR L. DUNCAN, OF OAKLAND, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

FRUIT-TREATING METHOD AND APPARATUS

Application filed January 5, 1926. Serial No. 79,428.

The present application relates to coring and pitting fruit and like articles, and more particularly the invention relates to improvements for pitting or coring and trimming fruit such as clingstone peaches, freestone peaches, plums, pears, apples and the like.

In natural formation of single pit fruits such as peaches the pit consists of two curved side surfaces, and a rib or fin like edge formed around the suture of the sides substantially in the plane of greatest sectional area of the pit. At the point of attachment of the stem to the fruit, the pit comes practically to the surface of the flesh or pulp where there is a natural depression, and substantially in the plane of the fin like edge or rib of the pit a natural crease is formed on the outside of the fruit. Opposite the stem end of the fruit a spike is formed on the pit and on the pulp, while on some varieties a fibrous growth extends from the spike of the pit to the spike formation on the pulp.

It has been heretofore the practice in pitting clingstone peaches by hand to make a cut with a straight single-bladed knife around the fruit to the depth of the pit, following the line of the outside crease then to insert from the stem end of the fruit, along one of the curved sides of the pit as a guide, a curved spoon shaped pitting knife, the edges of which are sharp, this pitting spoon being inserted within the pulp and in substantial contact with the pit to a sufficient depth, till one curved side of the pit reposes within the hollow of the pitting knife and in this position of repose, the central longitudinal line of the pitting spoon lies about midway between the lines of the fin like edge, rib or suture of the pit. The pitting spoon or knife is now forced by an oscillating movement through the pulp, from the position of repose to meet one side of the cut which is first made with the straight bladed knife, then receding through the pulp and meeting the opposite side of the cut made by the straight bladed knife. This separates one half of the peach. The other half, with the pit imbedded therein is then separated from the pit by gouging out the pit with the same curved pitting spoon. The pulp or flesh has now been separated substantially in halves, with the pit cut free in the manner above set forth. This prior hand process is relatively wasteful due to mutilation of a large percentage of the fruit by inexperienced and careless help, and is also slow and expensive.

I have discovered that when pitting fruit such as clingstone peaches improved results are obtained, and the pit may be economically removed if the natural crease and the fin like edge or rib formation or suture of the pit are utilized as a guide for insertion of the pitting spoon or knife. With the concept of utilizing as a basis, the fin like or ribbed edge of the pit and the natural crease on the outside of the fruit as guides, I have discovered various improved apparatus and methods of pitting or coring fruit such as clingstone peaches.

The preferred embodiments of my improved methods of pitting comprise the steps of utilizing the natural crease formation to indicate the location of the fin like or ribbed edge of the pit, inserting a curved pitting knife or spoon in the pulp along the fin like or ribbed edge of the pit as a guide for starting the pit or core removing operation, and cutting the pit free from the pulp starting from the fin like or ribbed edge of the pit instead of from the curved side of the pit as has been heretofore the practice. The pulp of the fruit is cut to free the central core or pit either before or after, but preferably before the fruit is halved. In the preferred embodiments of my invention a channel or groove is formed in the pulp of the fruit to be pitted or cored preferably in the plane of the crease, either by removing a slice therefrom or by forming a wedge shaped cut or incision therein, or by separating the pulp in any other manner substantially to the core to be removed to permit the entry of the cutting knife or pitting spoon in the cut, channel, or incision, or in the line of the cut, channel or incision. The central core containing the pit and undesirable pulp sections is then cut free from the remaining pulp sections.

In the canning of high grade peaches, it is preferable to remove the crease formation of the pulp together with the fibrous material extending from the spike end of the pulp to the spike end of the pit. For this reason it is frequently desirable to remove a slice from the flesh of the fruit including the natural crease formation and fibers. The removal of the slice is however not essential to the practice of the invention, as the pulp may be cut in halves to permit removal of the pit or core, or may be divided in any suitable manner. In removing a slice from the fruit it is not necessary to remove a section of sufficient width to permit the entry of a pitting knife as the object of removing a slice is to turn the objectionable matter from the fruit pulp, such as the fibrous materials mentioned, extending from the spike end of the pit to the spike appearing on the outside of the fruit pulp. As this objectionable matter is confined to a narrow width the trimming strip can also be confined to a narrow width. If the crease and fibrous formation is to be removed it is preferable to remove just enough of the pulp to cut out the undesirable sections, and to wedge the parts of pulp apart the remaining distance to permit insertion of the pitting knife without mutilating the trimmed surface of the pulp. When the crease and fibrous formations are not to be removed, the pulp may be wedged apart a sufficient amount to permit entry of the pitting knife between the separated pulp sections, or if desired, a plain cut can be made and a pitting spoon can be inserted in the line of the cut. Preferably this cut should be made on the line of the outside crease to insure the pitting spoon being inserted in the line of the rib or fin-like edge or suture of the pit.

Certain varieties of peaches have a red colored pulp surrounding the pit which if not removed is unsightly and causes discoloration of the remainder of the pulp in the course of canning. For this reason it is desirable in many varieties of peaches to remove a central core comprising a portion of the pulp adhering to or adjacent the pit from the remainder of the pulp. In freestone peaches, the portion of the pulp adjacent the pit is ordinarily irregular and unsightly and even though the reddish discoloration does not exist, it is desirable to remove a portion of the pulp adjacent the pit to present regular cavities in the portions to be canned. Before the pulp is separated into halves, the central core or pit and pulp to be removed may be cut free from the remainder of the fruit in accordance with certain forms of my invention. This method of operation while not desirable in the handling of the clingstone fruits, possesses certain advantages in handling the freestone fruits.

Accordingly an object of the present invention is to provide improved methods and apparatus for coring and pitting fruit.

Another object of the invention is to provide improved methods and apparatus separating a fruit in halves or sections and for removing a central core or pit therefrom.

Further objects of the invention are to provide improved methods and apparatus for cutting fruit into sections so that the cut edges will present smooth even and trimmed surfaces; preferably to remove the fibrous growth extending from the spike end of the pit through the pulp of the fruit and to cut the pit therefrom and present a smooth even pulp body in the cavity occupied by the removed pit; to provide a mechanically operated apparatus capable of operating on a greater number of fruits within a given time than is possible within the same time to be accomplished by present hand methods, and thereby increasing production and reducing the cost of halving, pitting and trimming the fruit.

Other objects of the invention are such as may be attained by a utilization of the various combinations, subcombinations, steps and principles in the relations to which they are adaptable by those skilled in the art without departing from the spirit of the invention and as set forth by the terms of the appended claims.

Figure 1:
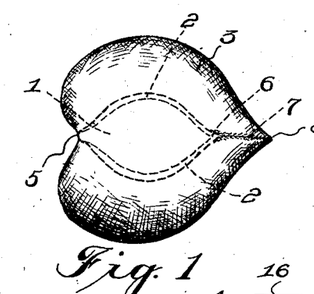
Figure 1 is a side elevation of a peach.
Figures 2, 4:
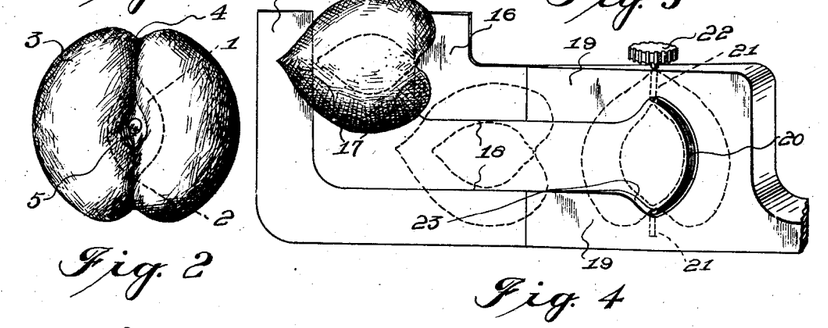
Figure 2 is a plan view of a peach showing the natural crease formation.
Figure 4 is a perspective view showing another form of apparatus for carrying out the invention.

The invention is especially adapted for the pitting of single stone fruits such as peaches and the preferred embodiments herein set forth are especially adapted for coring and pitting peaches, but the application thereof to coring or pitting various other fruits will be obvious to those skilled in the art. Accordingly, as shown in Figures 1 and 2, a natural peach formation comprises a pit 1 with curved side surfaces and around the suture of the curved sides a fin like edge or rib 2 is formed. The pulp 3 of the fruit forms around the pit and substantially in the plane of the suture and fin like edge or rib of the pit, a natural crease 4 appears in the pulp of the fruit. At the stem end of the pit, there is formed a natural depression 5 in the pulp of the fruit and the end of the pit comes approximately to the surface. Opposite the stem end of the pit a spike 6 ordinarily forms. Extending from the spike 6 in some varieties of peach is a fibrous growth 7 which terminates in a spike formation 8 opposite the stem end and on the pulp of the fruit.

Figure 3:
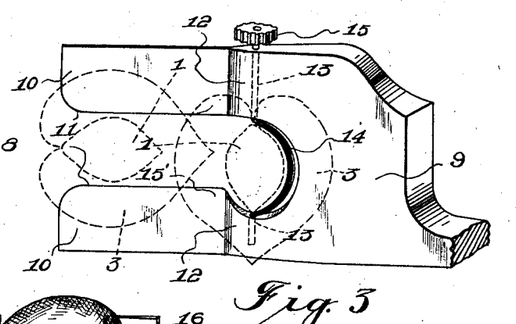
Figure 3 is a perspective view showing one form of apparatus for carrying out my invention.

One form of apparatus for carrying out my invention is shown in Figure 3. This form comprises a member 9 adapted to be supported in any suitable manner. Supported from the forward end of member 9 are the spaced cutting blades 10 provided with the substantially parallel cutting edges 11. Blades 10 merge into the narrow end wedging sections 12 and journalled in the wedging sections 12 in any suitable manner are supporting spindles 13 for a curved pitting knife 14. Knife 14 is adapted to be rotated under control of the operator by hand or in any suitable manner, as for example by means of pinion 15 secured to spindle 13 driven in any well known manner. Cutting edges 11 and inner edges 15' of the wedging sections 12 are spaced apart a sufficient distance to permit the passage of a fruit to be pitted, when held with the plane of the natural crease and suture of the pit substantially in the plane of the cutting edges 11 and preferably with a line passing through the stem and spike ends of the pit substantially parallel to the edges 11. Knife 14 is of such width and is normally positioned so that it lies within limits of the side planes of the wedging sections 12 and to the right of the axis of the spindles 13 as shown in Figure 3. In operation the fruit to be cored or pitted is then forced to the right between blades 10 with the plane of the crease substantially in the plane of the cutting edges 11 and preferably with a line through the stem and spike ends of the fruit substantially parallel to the cutting edges 11. The fruit is given a half turn as it enters and passes over the wedging sections 12, the inclined side surfaces wedge the pulp apart a sufficient distance to permit the positioning of the fruit as shown by the dotted outline in Figure 3 with pitting knife 14 adjacent one side and substantially in the plane of the fin like edge or rib of the pit. With the fruit held in this position, and the wedging sections 12 engaging the separated pulp sections, pitting knife 14 is given a half turn around the pit 1 of the fruit thus severing one half section of the fruit pulp. Then with the other half section clamped or held firmly in position in any suitable manner and bearing tightly against wedging section 12, pitting knife 14 completes its turn around pit 1 of the fruit and the central core lying within the path of rotation of the pitting knife 14 including the pit and undesirable central pulp section is cut free from the remainder of the pulp 3. The pulp halves are now separated and the central core embodying the pit is freed.

In Figure 4 a form of pitting apparatus is disclosed in which a pair of angular cutting members 16 are provided with the cutting edges 17 and 18 and are integrally formed with or connected to the wedging sections 19. Cutting edges 17 are preferably spaced apart a sufficient distance to permit the passage of a fruit with a line through the stem and spike end of the pit substantially at right angles to edges 17. Edges 18 are disposed at an angle, preferably a right angle, to and in the plane of edges 17 and are spaced apart a sufficient distance to permit the passage of the fruit with a line through the stem and spike end of the pit substantially parallel to and in the plane of edges 18 as indicated in the drawing. The curved pitting knife 20 is shaped to conform substantially with the contour of the fin like edge or rib formation of one side of the pit from the spike to the stem end, and is suitably supported on spindles 21 journalled in the wedging sections 19. Knife 20 may be rotated by a pinion 22 and is of such width and so positioned that it will normally lie within the sides or wedging plane surfaces or the wedging sections 19, in an opening or recess 23 shaped to receive the pit of the fruit to be cored with the line through the stem and spike end of the pit substantially aligned with the axes of the spindles 21. In operation of this form of the invention the fruit to be pitted is held by the operator with the plane of the crease substantially in the plane of the cutting edges 17 and with a line through the spike and stem ends of the pit substantially at right angles to the edges 17. The fruit is then forced downward between the cutting blades 16 and is then forced forward with the plane of the crease substantially in the plane of the cutting edges 18 and with the line through the stem and spike end of the fruit substantially parallel to the cutting edges 18. When the fruit reaches the beginning of the wedging sections 19 the pulp will have been cut completely around its periphery due to motion between the angular spaced cutting edges, and as the cut fruit is forced past wedging sections 19 the pulp will be wedged apart. As the pit of the fruit enters the opening or recess 23 in the wedging sections 19 the operator rotates the fruit until the line through the stem and spike ends of the pit is substantially in alignment with the axes of the spindles 21 and then causes a complete turn of the cutting knife 20 with the fruit held in the position indicated in Figure 4. This will cut the separated halves of the pulp free from the central core or pit.

Figure 5:
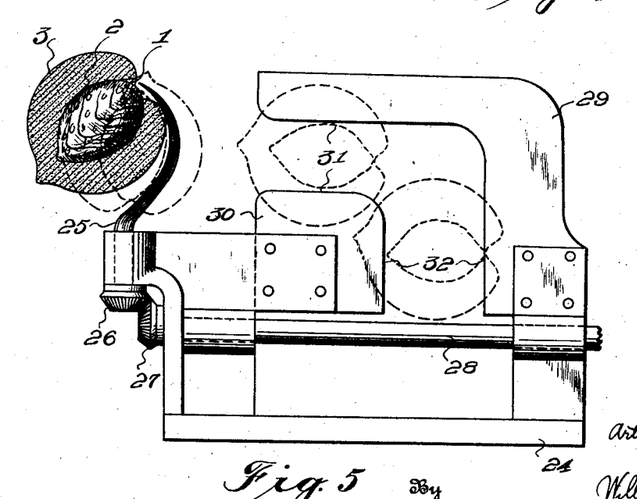
Figure 5 is a side elevation of still another form of apparatus for carrying out the invention.

Referring to Figure 5 a form of apparatus is shown in which the central core or pit is cut away from the adhering pulp. In this form of the invention a supporting framework 24 is provided upon which is journaled a curved pitting knife 25 shaped to conform with the contour of the fin like or ribbed edge of a pit of the fruit to be cored. Pitting knife 25 is driven by a bevel or miter gear 26 secured thereto which meshes with a bevel or miter gear 27. Gear 27 is secured to and driven in any suitable manner under the control of the operator. Secured to the supports 24 are the angular cutting knives 29 and 30 provided with the substantially parallel cutting edges 31 and 32. The cutting edges 31 are spaced apart a sufficient distance to permit the passage of fruit to be pitted with stem and spike ends of the pit disposed in a line substantially parallel to and in the plane of the edges 31. Edges 32 are spaced apart a sufficient distance to permit the passage of the fruit to be divided with a line through the spike and stem ends of the pit disposed substantially at right angles to and in the plane of the cutting edges 32. In operation of this form of device, the fruit to be cored is impaled by the operator as indicated in Figure 5 on the pitting knife 25 with the knife substantially in the plane of the crease and suture of the pit and with the one edge of the pit from the stem end to the spike end lying within the curve of the pitting knife as indicated in the drawing by the dotted outline of the fruit. With the fruit held in this position by the operator, the pitting knife is caused to turn through at least one revolution cutting the central core comprising the pit free from the pulp. The fruit is then withdrawn from the knife 25 and is passed between the cutting blades 29 and 30 as indicated by the dotted line positions of the fruit preferably with the plane of the crease and suture of the pit in the plane of the cutting edges. The passage of the fruit between the cutting edges 31 and 32 separates the pulp into halves and the pulp having been freed from central core or pit, the separated halves may be removed.

Figures 6, 8:
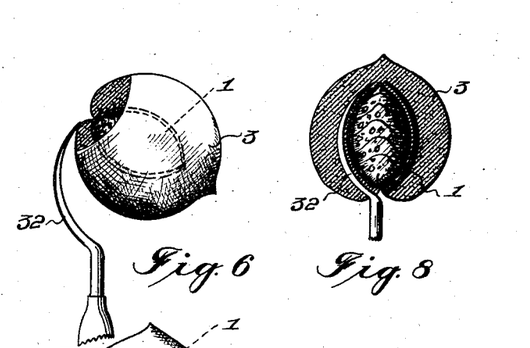
Figures 6 to 10 inclusive illustrate one method of carrying out my invention by hand.
Figure 7:
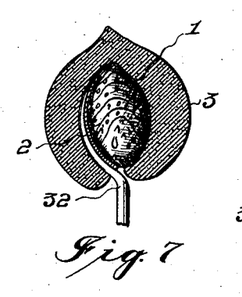
Figures 9, 10, 11, 12, 13:
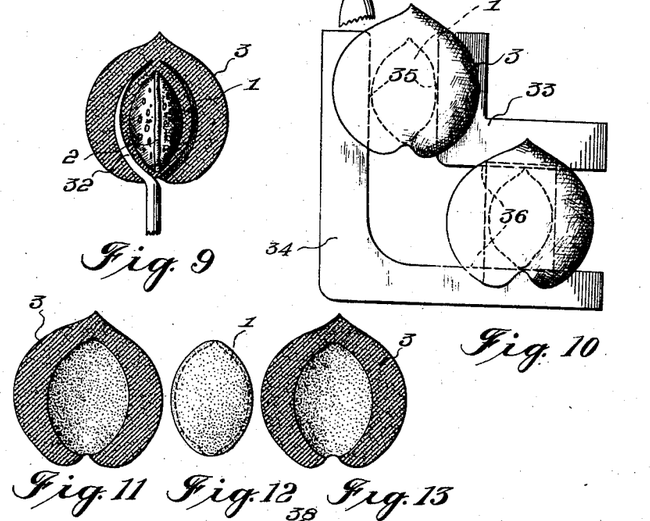
Figures 11, 12 and 13 illustrate a fruit after it has been cored or pitted in accordance with my inventions.

In Figures 7 and 9 the manner of carrying out my invention by hand is indicated. When the invention is carried out by hand a pitting knife 32 shaped to conform substantally with the contour of the pit shape from the stem to the spike end along the fin like or rib edge is inserted from the stem end of the fruit along the fin like or rib edge of the pit from the stem end of the fruit and preferably substantially in the plane of the natural crease formation as indicated in Figures 6 and 7. The central core including pit is then severed from the remainder of the fruit by causing the passage of the pitting knife through the pulp either by rotating the knife, the fruit, or both as indicated in Figures 8 and 9. After the central core has been cut free from the remainder of the pulp the knife 32 is withdrawn and the fruit may be halved in any suitable manner, for example, by removing a slice including the crease and fibrous formations in the manner set forth in my patents numbered 1,441,490 and 1,534,507.

A convenient form of apparatus for separating the pulp into halves either before or after the central core has been cut free from the remainder of the fruit is shown in Figure 10. In this form of device a pair of angular cutting blades 33 and 34 are suitably supported in any desired manner with the cutting edges 35 and 36 parallel to each other substantially in the same plane. The cutting edges 35 are spaced apart a sufficient distance to permit the passage of a fruit to be divided with the stem and spike ends of the pit disposed substantially midway between the edges 35, and edges 36 are disposed apart a sufficient distance to permit the passage of the pit with a line through the stem and spike ends of the pit disposed substantially at right angles to and in the plane of edges 36. The fruit to be cut is forced between the blades 33 and 34 as indicated preferably with the plane of the crease or suture substantially in the plane of the cutting edges, and a cut will be formed entirely around the pulp of the fruit.

In pitting peaches by first cutting the core including the pit from the remainder of the pulp and then halving the pulp it is preferable to pass the fruit between the blades in such manner that the fruit is divided substantially in the plane of the crease, but this is not essential, as the pulp may be divided in any other plane to free the halves from each other and permit the removal of the central core or pit. After the fruit has been treated in accordance with my improved invention, it will be separated into pulp sections and a central core containing the pit as indicated in Figures 11, 12 and 13 of the drawing.

Figure 14:
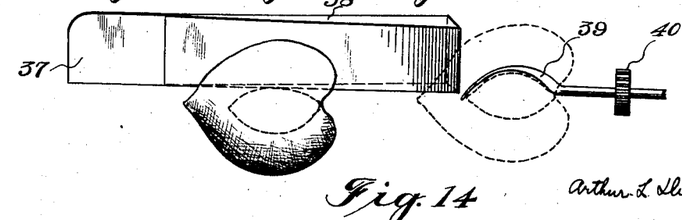
Figure 14 illustrates a further modification and apparatus for carrying out the invention.

In Figure 14 another form of apparatus for carrying out my invention is disclosed. A single cutting blade 37 may be provided which is connected to a wedging section 38. Disposed adjacent the end of the wedging section 38, is a curved pitting knife 39 which is adapted to encompass one side of the pit of the fruit to be treated along the fin like edge or rib. Knife 39 is suitably supported and may be rotated in any well known manner through a gear 40 under control of the operator. The fruit to be pitted is moved past the cutting edge of the blade 37 in a manner to cut the pulp substantially to the pit and preferably in the plane of the crease or suture of the pit as indicated in the drawing. As the fruit moves past the wedging section 38 the pulp is wedged apart sufficiently for positioning of the fruit as shown so that the curved pitting knife 39 will enter the incision or channel and encompass one edge of the pit from the stem to the spike end. With the fruit held in this position the operator causes a rotation of the pitting knife 39 to free the central core lined within the path of rotation of the knife 39 free from the remainder of the fruit. The fruit is then withdrawn and the pulp separated into halves in any suitable manner to permit the removal of the central core or pit. If desired a cut may be formed completely around the fruit by turning the same against the cutting edge of the knife 37 prior to wedging the pulp apart to permit entry of the knife. The pulp is then wedged apart, and presented to knife 39 in the manner above set forth. After the knife 39 has made one complete revolution, the separated halves of the pulp will be freed from the central core and the pitting operation will be completed.

While my invention may be carried out in the manners hereinbefore set forth, in order to speed the pitting operation and to produce high grade, trimmed and pitted fruits, I have devised an improved mechanism hereinafter set forth.

Figures 15, 21, 22, 23, 24, 25:
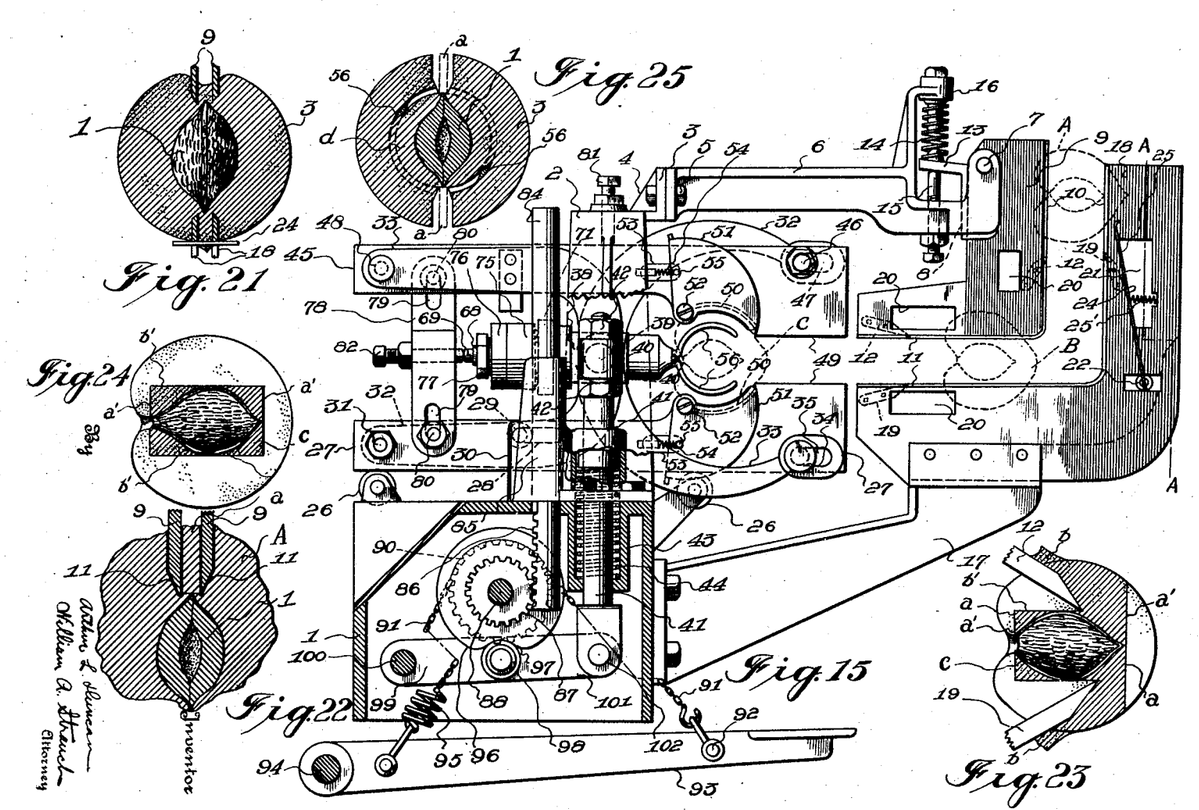
Figure 15 is a side elevation of a preferred arrangement of mechanism for carrying out the invention rapidly.
Figure 21 is a fragmental sectional view showing the position of parts as a fruit to be pitted enters between the pulp separating knives in Figure 15.
Figure 22 is a fragmental sectional view showing the manner in which the pulp separating knives enter the pulp of the fruit and illustrating the wedging effect of the beveled edges of the knives.
Figure 23 is a view showing the manner in which the sections of a circumferential slice are removed from the fruit by the slice removing knives.
Figure 24 is a sectional view illustrating the separated pulp of the fruit and the pulp remaining at the base of the channel formed in the fruit after it has passed between the pulp separating knives.
Figure 25 is a fragmental sectional view illustrating the wedging effect of the pulp separating knives, and the action of the pitting or coring knives in the form of invention shown in Figure 15.
Figures 16, 17, 18, 19, 20:
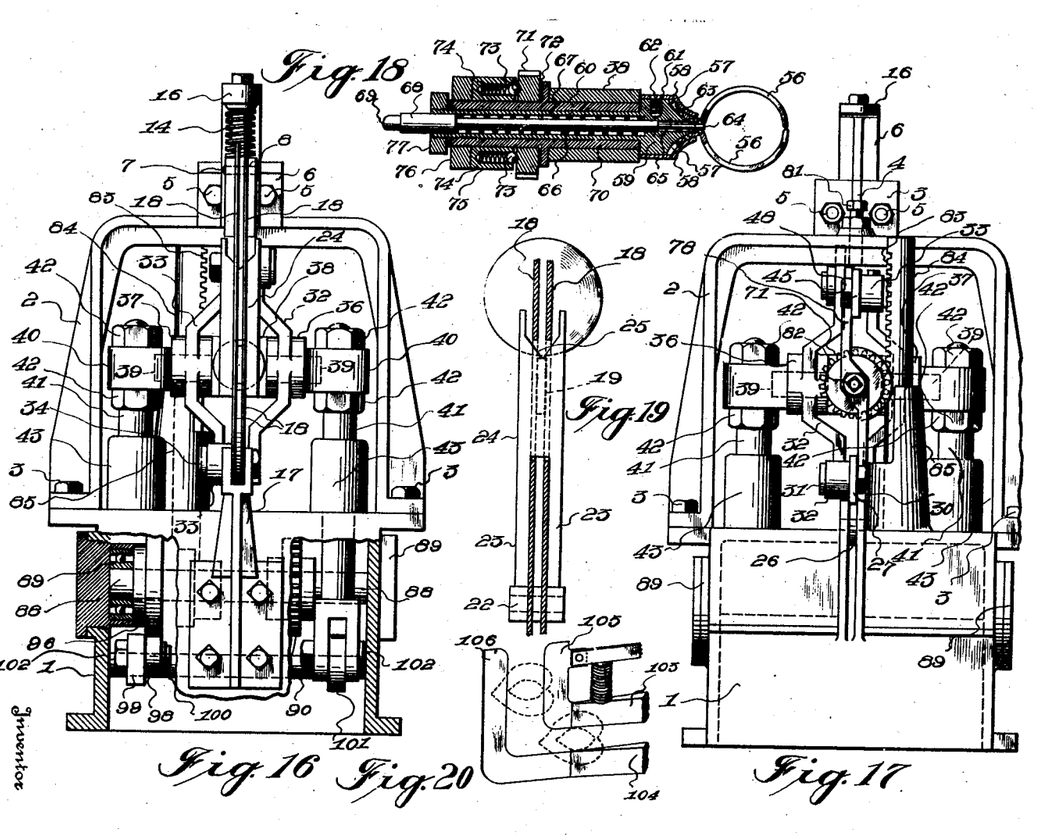
Figure 16 is a front elevation, partially in section of the form of invention shown in Figure 15.
Figure 17 is a rear elevation of the form of invention shown in Figure 15.
Figure 18 is a detail sectional view showing the supports and mountings for the pitting knives in the form of invention shown in Figure 15.
Figure 19 is a sectional view taken along line A—A of Figure 15.
Figure 20 shows a modified form of pulp separating knives adapted for use in place of the slice removing knives shown in Figure 15.

Referring to Figures 15, 16 and 17, a supporting casting or frame-work 1 has secured to the upper surface thereof a yoke or bracket 2 by means of bolts or cap screws 3. Formed on the upper part of bracket 2 is a securing flange 3 reinforced by a suitable rib 4. Secured to and projecting from flange 3 by means of bolts 5 is a supporting arm or bracket 6. Pivotally supported on extensions or ears of the arm or bracket 6 by means of the pin 7 is a knife supporting member 8 in which a pair of spaced angular slice removing and wedging knives 9 are secured. Knives 9 are provided with beveled wedging surfaces 10 and 11 (Figures 15 and 22) and are secured with their inner surfaces spaced apart a distance equal to the thickness of a strip or slice that is desired to be removed from the fruit. The knives 9 are of such thickness that the outer surfaces thereof are spaced apart a distance approximately equal to the width of the channel or groove to be formed in the pulp of the fruit for entry of the pitting knives and gripping members as will hereinafter more fully appear. Ordinarily the cutting knives 9 are arranged to wedge the pulp apart a sufficient amount to form a channel or groove equal in width to about twice the width of the removed strip or slice (Figures 22 and 25). In practice a strip of about $\frac{3}{32}$ inch is preferably removed while the wedging action is sufficient to form a channel permitting entry of a pitting knife about $\frac{1}{4}$ inch wide in the channel formed. Secured between the knives 9 are the slice removing knives 12 (Figure 15). Formed on the member 8 is an extension 13 which is held by means of spring 14 against an adjustable stop member 15 supported in an arm 6. One end of spring 14 abuts against the upper surface of extension 13 and the other end thereof abuts against the projection 16 of arm 6.

Supported from the frame or casting 1 by means of the bracket 17 are the spaced angular cutting knives 18. Knives 18 provided with beveled edges 10 and 11, are of the same thickness and have their inner surfaces in planes with the inner surfaces of blades 9. The cutting edges 10 of the blades 9 and 18 are substantially parallel and spaced apart a sufficient distance to permit the pits of fruit to be cored to pass between them with a line through the stem and spike ends of the pit substantially at right angles to the cutting edges 10, and cutting edges 11 of the blades are substantially parallel and spaced apart a sufficient distance to permit the passage of a fruit with the stem and spike ends of the pit substantially midway between the edges 11 as indicated by the dotted line fruit positions shown in Figure 15. Secured between the inner surfaces of the blades 18 are the slice removing knives 19. Formed in the blades 9 and 18 are the openings or recesses 20 and 21 through which strips of pulp removed by the knives 12 and 19 may pass outward.

Pivotally supported from the blades 18 by means of a pivot pin 22 (Figures 15 and 19) are supporting extensions 23 of pulp trimming member 24. The extensions 23 straddle the body portion of member blades 18 and the body portion of member 24 passes through and is held by means of the compression spring 25' against the inner inclined edges of the recesses 21 in the knives 18. Formed in the upper end of the member 24 is a V-shaped trimming notch 25 normally positioned so that it will trim the protruding spike formation from the pulp of the fruit as it is forced downward between the blades 9 and 18.

Supported above the upper surface of the frame work or casting 1 by rollers 26 is a gripping member 27. Formed in member 27 is a guide slot 28 through which a supporting and guide pin 29 extends. Pin 29 is supported from projection 30 of the frame or casting 1 guiding and limiting reciprocating movement of gripping member 27 on rollers 26 and holding it properly in position during the operation of the machine. The rear end of gripping member 27 is pivotally connected by a pin 31 to the end of a tong member 32 and at its forward end is connected to the forward end of gripping member 27 by means of a pin 34 extending slidably through slot 35 of the member 33. The tong members 32 and 33 are positioned on opposite sides of the gripping member 27 and at their centers are provided with the spaced supporting bosses 36 and 37 (Figures 16 and 17). Positioned between the bosses 36 and 37 is a pitting knife supporting block 38 provided with the trunnion members or pins 39 upon which bosses 36 and 37 are pivotally supported. The outer ends of pins 39 are journaled in actuating blocks 40. Blocks 40 are adjustably secured to the ends of vertical plunger rods 41 by means of the adjusting and securing nuts 42. Plungers 41 are slidably supported in cylindrical bores formed in the vertical guide and supporting members 43 of the frame 1. Seated within suitable recesses formed in the guide and supporting members 43 compression springs 44 are interposed between shoulders formed on the rods 41 and seats formed in the members 43. Springs 44 normally hold rods 41 in the position shown in the drawings.

Gripping member 45 positioned directly above member 27 is supported at its forward end by pin 46 secured thereto which fits slidably in slot 47 of tong member 32, and is pivotally supported at its rear end by means of pin 48 to the rear end of tong member 33. Gripping members 27 and 45 are normally positioned with edges 49 thereof substantially aligned with the cutting edges 11 of the knives 9 and 18. The ends of the members 27 and 45 adjacent knives 9 and 18 may be of a width equal to the width of the channel formed in a fruit after it has been forced between knives 9 and 18 so that as the fruit is forced past the end of the knives 9 and 18 the ends of the members 27 and 45 will enter in the channel formed in the fruit. If desired the ends of members 27 and 45 may be wedge shaped to exert a further wedging action on the divided halves of the pulp of the fruit. Formed in gripping members 27 and 45, back of the surfaces 49, are recesses 50 shaped to receive the adjustable jaw members 51. Jaw members 51 are pivotally secured to the members 27 and 45 by means of pins 52, and the sides thereof straddle and are preferably flush with the sides of members 27 and 45. Within slots or recesses 53 formed in gripping members 27 and 45 are the compression springs 54 which abut against pins 55 supported in the sides of the jaw members 51 and extending through the slots 53. Springs 54 normally force jaw members 51 about the pivots 52 until pins 55 engage the edges of the slots 53. Jaws 51 are free to move about pivots 52 against the tension of springs 54 to grip various size fruit pits as will hereinafter more fully appear.

Disposed between the jaw members 51 are the rotatable pitting knives 56, (Figures 15 and 18). Knives 56 are provided with curved supporting shanks 57 which fit slidably into slots 58 formed in the end 59 of a hollow rotating spindle 60. A cap 61 removably held in position by means of a screw member 62 holds shanks 57 of the knives 56 slidably in the slots 58. Formed on the inner surfaces of shanks 57 are a series of depressions 63 which are adapted to register with suitable projections 64 formed on an extension 65 of knife actuating and adjusting rod 66. Surrounding rod 66 and confined in a bore formed in the spindle 60 is a compression spring 67 which abuts against the end of a section 68 of rod 66 normally forcing the rod 66 together with extension 65 and actuating projection 69 thereof to the left in Figure 18 causing the projections 64 of the extension 65 to move the knives 56 together as shown in Figure 18. Spindle 60 is supported in and rotatable with a sleeve 70 which in turn is rotatably supported in a bore or journal formed in the supporting block 38. A driving pinion 71 rotatably mounted on the sleeve 70 is normally held against a friction surface 72 by means of the balls 73 and springs 74 seated in recesses formed in collar 75 which is rotatably supported on sleeve 70. Collar 76 threaded on the end of sleeve 70 holds collar 75 in position and permits adjustment of the tension of springs 74. A nut 77 is provided on the end of sleeve 60 for locking the parts in assembled relation.

A member 78 (Figures 15 and 17) provided with the slots 79 is secured to the gripping members 27 and 45 by means of the pins 80 which fit slidably into slots 79 and are secured in the members 27 and 45 respectively. Provided in the yoke 2 is the limit or stop screw 81. Members 78 and 81 limit the separating movement of the gripping members 27 and 45 under influence of the springs 44. Supported in the member 78 is an adjustable screw 82 the forward end of which engages the end of knife actuating extension 69 with gripping members 27 and 45 separated, compressing spring 66 and forcing the knives 56 apart a sufficient amount to permit the entry of the pit of the fruit to be cored between the knives 56 as indicated in Figure 15.

Driving pinion 71 for the knife blade 56 meshes with a rack 83 formed on a rack member 84 which is slidably supported for vertical motion in supporting member 85 of the frame 1. Formed on the bottom of rack member 84 is a driving rack 86 which meshes with and is driven by a pinion 87 which in turn is supported on and driven by a shaft 88 (Figure 15). Shaft 88 is journaled in suitable bearings 89 supported in the sides of the frame 1 and is driven in any suitable manner under control of the operator. As shown in the drawings shaft 88 is driven by a sprocket wheel 90 which in turn is driven by a chain 91, secured at 92 to the forward end of a foot treadle 93. Treadle 93 is pivoted at 94 to a suitable support not shown and chain 91 is secured at its other end by means of the spring 95 to treadle 93. Secured on and driven by the shaft 88 is a cam 96 in which a depression 97 is formed. A roller 98 seats in the depression 97 of cam 96 with the parts in the position shown in Figure 15. Roller 98 is secured intermediate the ends of and actuates an arm 99 which in turn is rigidly secured to and actuates a shaft 100 journaled in the frame 1. Secured to and actuated by the shaft 100 is an arm 101 (Figure 16) and the outer ends of arms 99 and 101 are connected by means of pins 102 to the lower ends of the actuating plungers 41.

Instead of the double bladed knife arrangement 9 and 18 arrangement for removing a slice from the fruit, single bladed angular wedging knives 103 and 104 such as are disclosed in Figure 20 and preferably provided with the narrow cutting sections 105 and 106 may be substituted therefor. If desired cutting and wedging knives with narrow angular cutting sections such as indicated at 16 in Figure 4 with short wedging sections as indicated at 19, may also be utilized in an obvious manner to wedge the pulp apart a sufficient distance to permit entry of the ends of gripping members 27 and 45 into the channels formed in this manner.

In operation of the form of invention shown in Figures 15 to 19 on peaches, the fruit to be pitted is held with the plane of the crease preferably disposed substantially parallel to and between inner surfaces of the knife blades 9 and 18, with a line through the stem and spike end of the fruit substantially at right angles to the edges 10 of the knives and with the spike end of the fruit to the right as indicated by the dotted fruit position "A" in Figure 15. The fruit is forced downward between the blades and as indicated in Figure 22 a section of pulp "a" comprising the crease formation of the fruit is cut from the pulp and the pulp is wedged apart on each side a distance substantially equal to the thickness of the knives 9 and 18. As the fruit is forced past the V-shaped notch 25 of member 24, the spike formation on the pulp of the fruit will be trimmed off, and as it passes the first pair of knives 12 and 19 the sections "a'" are cut free from the pulp lines "a" in Figure 23. Continued downward movement of the fruit aligns the pit with the space between the beveled cutting edges 11. The fruit is then forced forward between edges 11 with the stem and spike ends of the pit substantially midway between the edges 11 as indicated by the dotted fruit position "B". As the fruit passes the second pair of knives 12 and 19 the slice sections $b$ of pulp are removed along lines $b'$ as indicated in Figure 23. After the pulp has passed the second pair of knives 12 and 19, a channel will be completed around the fruit leaving a central core C of pulp encompassing the pit to be removed as indicated in Figure 24. The fruit is forced from between knives 9 and 18 causing the pit of the fruit to pass between the edges 49 of the gripping members 27 and 45 and finally the fruit is positioned with the pit disposed between the cutting knives 56 as indicated at "C", with knives 56 in the plane of the suture of the pit. Foot treadle 93, or other suitable driving means, is then depressed causing rotation of shaft 88. Initial rotation of shaft 88 actuates cam 96 and forces roller 98 out of cam depression 97 depressing arms 99 and 101 suddenly. Downward movement of the arms 99 and 101 causes depression of plungers 41 against the tension of springs 44 and lowers supporting trunnions and tong pivots 39 together with knife supporting block 38 and causing a closing of the tong members 32 and 33 and gripping members 27 and 45 to bring edges 49 into engagement. This movement of the gripping members 27 and 45 causes pivoted jaws 51 to enter channel formed therein and to grip the fruit in the plane of the suture of the pit. It will be noted that springs 54 will permit the engagement of the fruit with a predetermined pressure and will then yield and rotate slightly about a pivot 52, in this way compensating for different sized pits. The closing motion of tong members 32 and 33 causes movement of pins 34 and 46 to the left and a corresponding leftward motion of the gripping members 27 and 45 and of the member 78 in Figure 15.

This motion of member 78 relieves the pressure of the stop member 82 on knife actuating extension 69 and spring 67 will force rod 66 together with the extension 65 thereof to the left closing knives 56 until the central core "c" of adhering pulp (Figure 24) is engaged and compressed a sufficient amount to overcome the pressure of spring 67. After plungers 41 have been depressed as set forth continued rotation of shaft 88 will drive pinion 87 to depress rack member 84, and downward movement of rack member 84 will cause rotation of driving pinion 71 causing the rotation of knives 56 through the pulp of the fruit in a path encompassing the central core to be removed including the pit as indicated in Figure 25, starting from the plane of the fin like edge or suture of the pit. After the knives 56 have turned through about 180° the central core "d" will be severed from the separated halves and the separated trimmed pulp will fall free from the central core comprising the pit. The operator then may remove his foot from treadle 93 and the parts will be restored to the position shown in Figure 15 for another coring operation.

It is to be noted that because of the use of two pitting knives 56 in the forms of invention shown in Figures 15 to 19 it is not necessary to hold one half of the pit against the jaws 51, as is the case where only one pitting knife is used as shown in Figures 3 and 4. It will be apparent that by using two pitting knives in obvious manner to simultaneously cut both halves of the pulp free from the central core or pit, the necessity for holding or clamping one half of the pit against the wedging sections will be eliminated in these forms of my invention.

While the pitting of peaches has been specifically described it will be obvious that plums, apples, and like fruits may be cored and halved in accordance with my improved apparatus and my improved methods. It will be seen that the methods for coring and pitting fruits hereinbefore set forth may be carried out in various manners by hand and by different types of apparatus and it will be understood that the invention is not limited to the specific form of apparatus and methods hereinbefore set forth, but that various modifications therein may be made by those skilled in the art without departing from the spirit of the invention.

Accordingly, having described the preferred embodiments of my invention, what is desired to be secured by Letters Patent and claimed as new is:

1. That step in the method of seeding or coring a fruit which consists in forming a channel around the fruit to the depth of a central core to be removed by wedging sections of the pulp apart to form a channel and holding the sections apart for the entry of a coring knife.

2. That step in the method of seeding or coring a fruit which consists in forming a channel around the fruit by removing a slice from the pulp to the depth of the core to be removed and simultaneously wedging the pulp sections apart and holding the sections apart for the entry of a coring means.

3. The method of pitting a clingstone peach which comprises wedging the pulp apart while the stone is intact, to the depth of a central core to be removed, holding the sections apart, entering a pitting means in the cut or channel formed and severing the central core including the stone from the remainder of the pulp.

4. The method as set forth in claim 3 in which the cut is formed in a plane comprising the natural crease formation of the fruit.

5. The method as set forth in claim 3 together with the step of removing a slice from the fruit together with the wedging step to form the channel.

6. The method of pitting a peach which comprises cleaving the flesh of the fruit without severing the pit and expanding the cleft in the flesh to permit insertion of a pitting means to sever the intact pit from the flesh.

7. The method of pitting and trimming a peach which consists in simultaneously trimming and halving the peach in the plane of its crease, wedging said halves apart to expose the edge of said pit and cutting the pit from the peach by a cut that begins and ends substantially at said exposed edge.

8. A peach pitter comprising spaced members carrying halving knives providing a path for the pit of the peach between them, and a rotatably mounted cutter, said cutter being provided with ends journaled in said members, and an intermediate bowed portion extending across said path, said bowed portion conforming approximately to the pit to be removed.

9. A fruit pitter comprising a slotted blade adapted to impale a fruit, and a single pitting knife revolvably mounted at the back of the slot with the axis of the pitting knife normal to the direction of movement of the fruit during the impaling operation and in the plane of the blade.

10. A fruit pitter comprising a slotted blade adapted to impale a fruit, a single pitting knife revolvably mounted at the back of the slot with the axis of the pitting knife normal to the direction of movement of the fruit during the impaling operation and in the plane of the blade, and means to turn the pitting knife.

11. A fruit pitter comprising a slotted blade adapted to impale a fruit, pitting means mounted on an axis normal to the direction of movement of the fruit during the impaling operation and at the back of the slot, and means to turn the pitting means.

12. A fruit pitter comprising bifurcated impaling means, and a revolvable pitting knife having one end mounted on one bifurcation and the other end mounted on the opposite bifurcation.

13. In a fruit pitter, a bifurcated impaling means, a bearing on each bifurcation, and a revolvable pitting knife having its opposite ends mounted in said bearings.

14. In a fruit pitter, a bifurcated impaling blade, a bearing in each bifurcation, and a revolvable pitting knife having its opposite ends mounted in said bearings, the width of the impaler blade defined by said bearings being substantially no greater than the thickness of the pitting knife.

15. In a fruit pitter, a bifurcated impaling blade providing cleaving knives along the front and opposing edges of the bifurcations, and a revolvable pitting knife mounted in the plane of the blade and having its opposite ends mounted on the opposing bifurcations.

16. A fruit pitter having a slotted impaling blade adapted to cleave the flesh of the fruit, and pitting means revolvably mounted in the slot and adapted to enter the cleft in the flesh of the fruit produced by the impaling blade.

17. In a fruit pitter, an impaling member upon which fruit may be forced to produce an annular cleft in the flesh of the fruit around the intact pit without removing a portion of the flesh of the fruit, means provided by said impaling member for expanding the cleft in the flesh of the fruit, and pitting means mounted on said impaling member and operable through said expanded cleft to pass axially around the pit.

18. In a fruit pitter, an impaling member upon which fruit may be forced to produce a cleft in the flesh of the fruit around the intact pit, means formed on said impaling member for expanding the cleft in the flesh of the fruit, pitting means mounted on said impaling member and operable through the cleft in the flesh of the fruit to revolve axially about the pit, and means for turning said pitting means.

19. In a fruit pitter, a wedge-shaped impaling member upon which fruit may be forced to complete and expand an annular cleft in the flesh of the fruit around the intact pit, and pitting means mounted on said impaling member and adapted to enter said expanded cleft and pass axially around the pit.

20. In a fruit pitter, an impaling member upon which fruit may be forced and turned to complete an annular cleft in the flesh of the fruit around the intact pit, the impaling member having a pit receiving slot of a width less than the longer diameter of the pit and communicating with an aperture of a size permitting the pit to turn to a position normal to the direction of movement of the pit while passing through the slot, and revolvable pitting means mounted at the back of the aperture and against which the pit is aligned upon being so turned in said aperture.

21. A fruit dividing and coring device comprising spaced knives providing a path between them for the core of the fruit, a curved knife extending across said path, and means to rotate said curved knife.

22. A fruit pitter comprising spaced elements separated by a gap approximating one of the dimensions of the pit of the fruit in the plane of its suture, said gap providing a path for the pit of the peach, pitting means to cut the pit from the peach arranged across said path and normally located substantially between parallel planes bounding the outermost side surfaces of said elements and means to operate said pitting means.

23. A fruit pitter comprising elements having edges spaced a distance approximating one of the dimensions of the pit in the plane of its suture to form a path for the pit of the fruit, said edges serving to guide and determine the course of the fruit, and pitting means arranged in said path in position to serve as an abutment at the end of said path and fix the position of the pit of the fruit with respect to said pitting means.

24. A fruit pitter comprising a pitting means, means to guide the fruit into position so that an edge of the pit is brought into proximity to said pitting means, said guiding means including elements that form a cleft in the fruit of a width sufficient to permit the fruit to be brought into position adjacent the pitting means, and means to rotate said pitting means.

In testimony whereof I affix my signature.

ARTHUR L. DUNCAN.